(No Model.) 3 Sheets—Sheet 1.

C. A. HASKINS.
DISH WASHING BASKET.

No. 457,318. Patented Aug. 4, 1891.

Witnesses
W. C. Cowles
L. E. Meacham

Inventor
Charles A. Haskins
By Jas A Cowles
Atty.

(No Model.) 3 Sheets—Sheet 2.

C. A. HASKINS.
DISH WASHING BASKET.

No. 457,318. Patented Aug. 4, 1891.

Witnesses
W. C. Corliss
L. E. Meacham

Inventor
Charles A. Haskins
By Jas A Cowles
Atty.

(No Model.) 3 Sheets—Sheet 3.
C. A. HASKINS.
DISH WASHING BASKET.
No. 457,318. Patented Aug. 4, 1891.
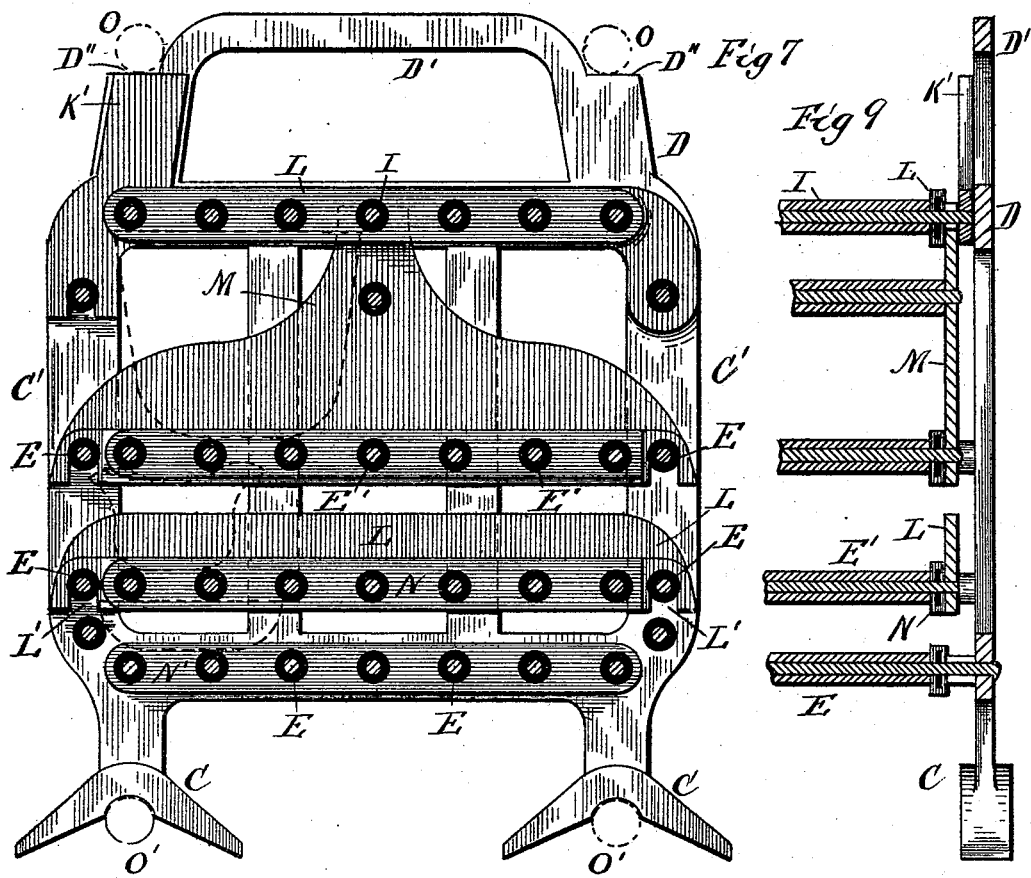
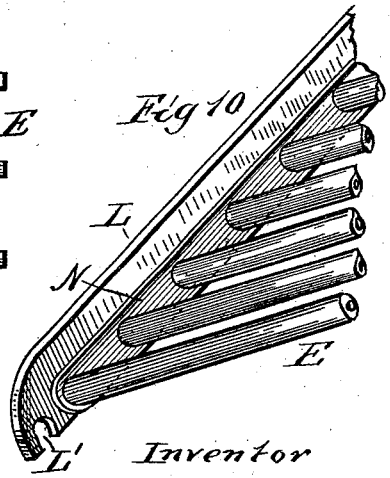
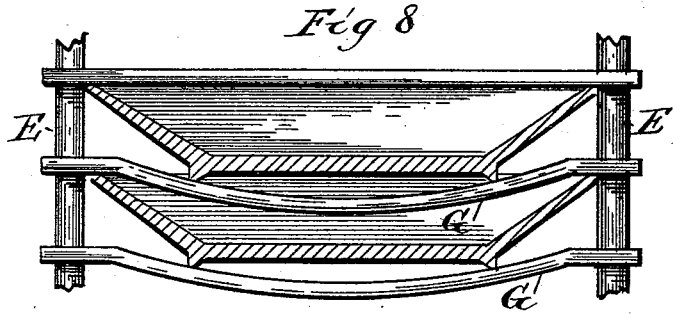
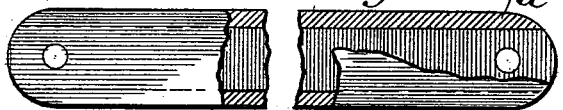
Witnesses
W. C. Corlies
L. E. Meacham
Inventor
Charles A Haskins
By Jas A Cowles
Atty

UNITED STATES PATENT OFFICE.

CHARLES A. HASKINS, OF CHICAGO, ILLINOIS, ASSIGNOR TO GILBERT MONTAGUE, OF SAME PLACE.

DISH-WASHING BASKET.

SPECIFICATION forming part of Letters Patent No. 457,318, dated August 4, 1891.

Application filed November 11, 1889. Serial No. 329,910. (No model.)

*To all whom it may concern:*

Be it known that I, CHARLES A. HASKINS, a citizen of the United States, residing in the city of Chicago, in the county of Cook and State of Illinois, have made certain new and useful Improvements in Dish-Washing Baskets, of which the following is a specification.

Figure 1:
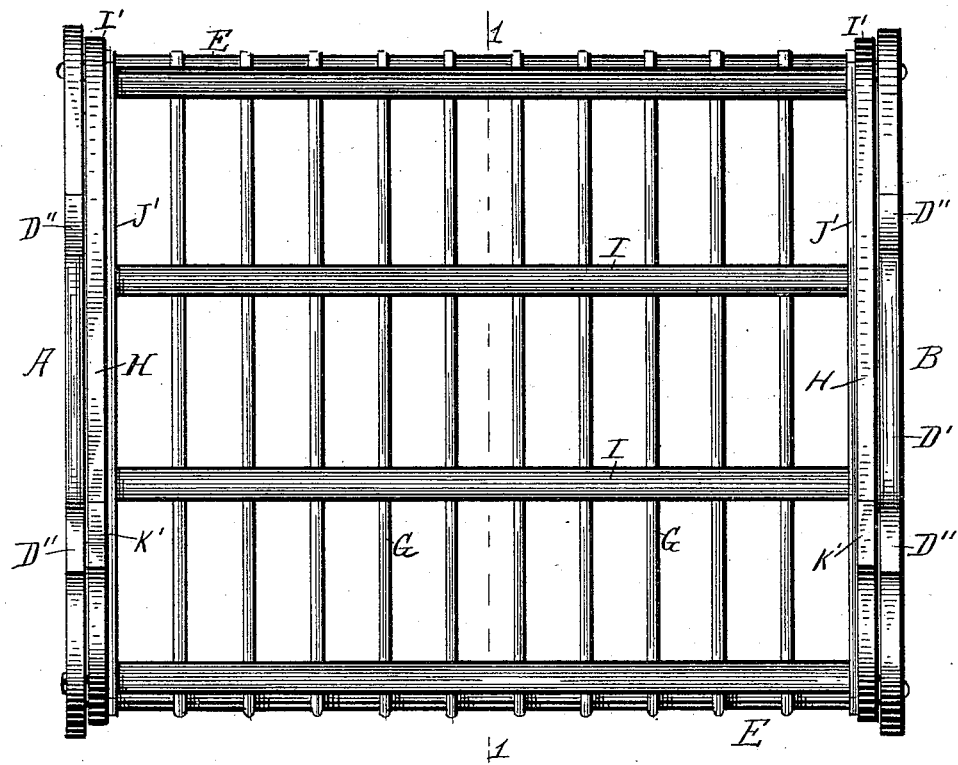
Figure 2:
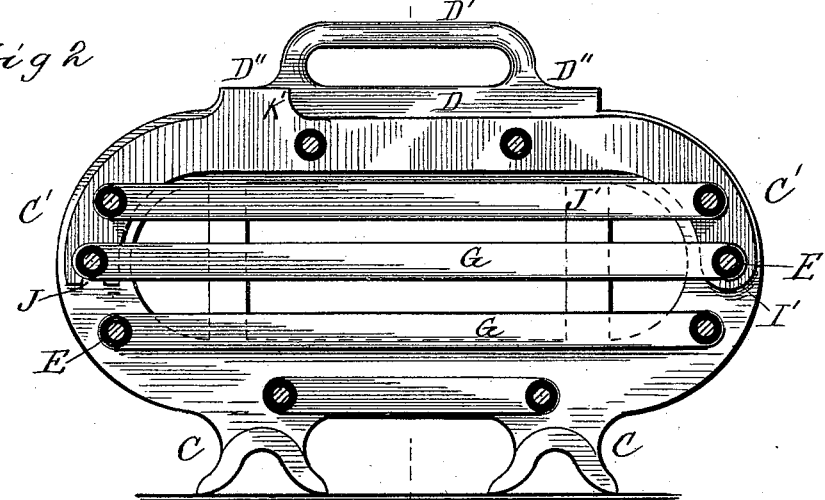
Figure 3:
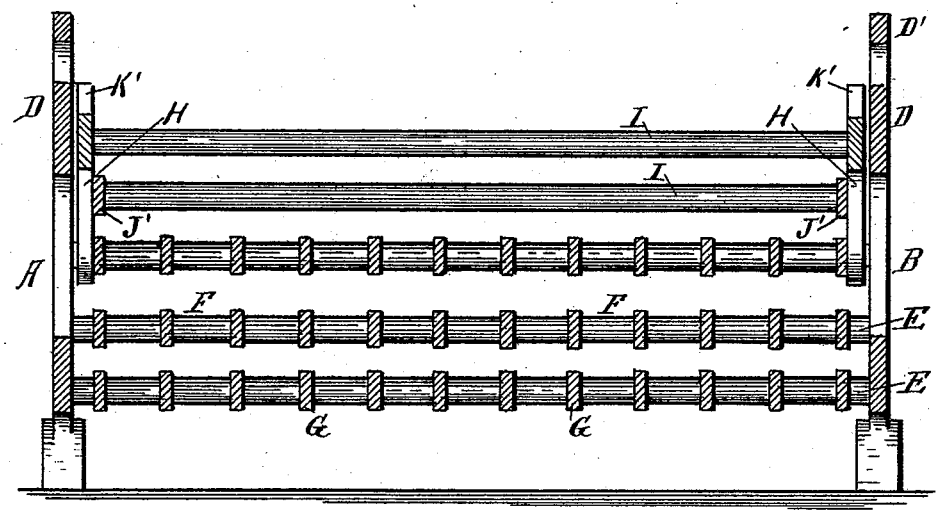
Figure 4:
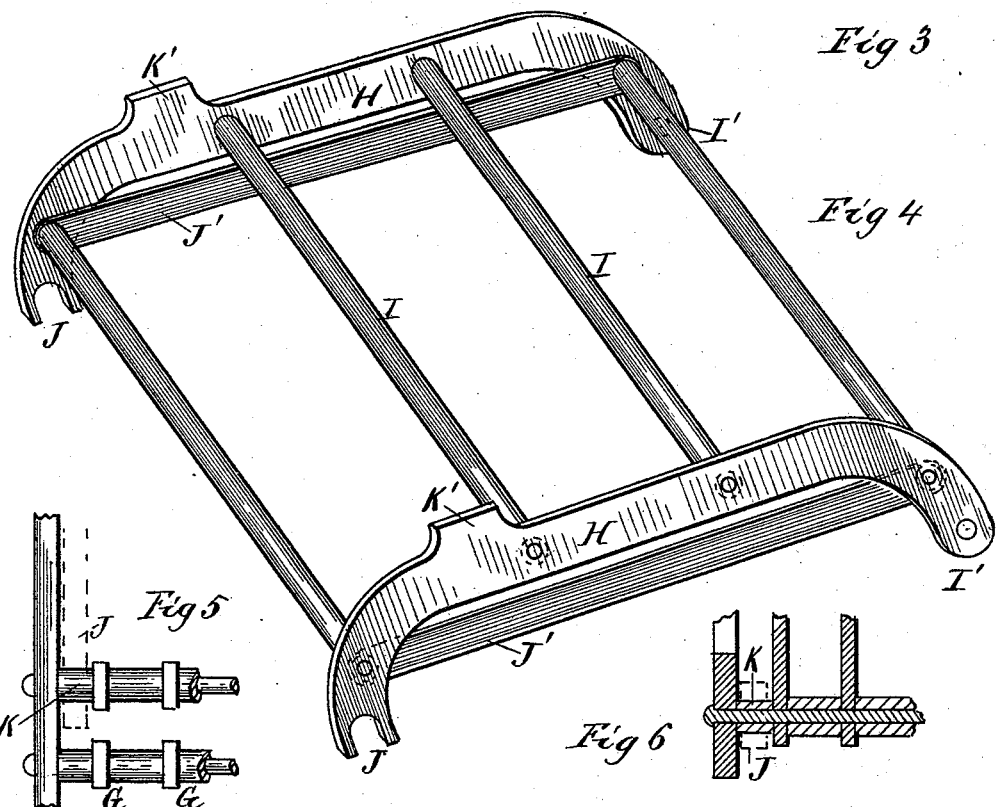
Figure 5:
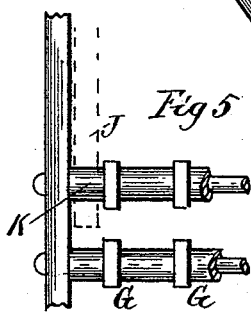
Figure 6:
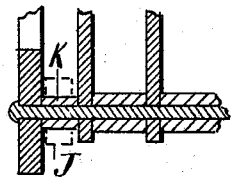

Figure 1 is a plan view. Fig. 2 is a cross-sectional elevation through line 1 1 of Fig. 1. Fig. 3 is a longitudinal sectional elevation through line 2 2 of Fig. 2. Fig. 4 is a perspective of the lid or cover. Figs. 5 and 6 are details. Fig. 7 is an end elevation of a modified form of basket. Fig. 8 is a detail showing elastic partitions forming compartments and dishes in compartments. Fig. 9 is a vertical section of one end of the basket shown in end view in Fig. 7. Fig. 10 is a perspective detail of part of tray-formed partition. Figs. 11 and 12 are details of elastic steel ribbons forming partitions in baskets.

The object of this invention is to provide a durable and practical dish-washing basket. My dish-washing basket is made of two head-pieces A and B, Figs. 1 and 3. Each head-piece in the same basket is made alike, in a single piece and uniform, and consists of the bifurcated feet C C, side bars C' C', and the part D, provided with the handle D' and shoulder D'' at each end of the handle. These heads are joined together by longitudinal rods E E, which are provided with nuts, shoulders, and heads (not shown) to rigidly hold the two head-pieces in position at a determined distance apart. There are as many of these longitudinal rods as are necessary to accomplish the result desired, and there are the same number of them on each side of the basket. These rods are covered with a refractory elastic material. The basket thus formed is divided into compartments by extending ribbons of steel G G, Figs. 1 and 2, from one longitudinal rod to the one immediately opposite, and then another one right over it, and so on until the entire basket is divided into compartments. (See Fig. 2.) The ribbons are made by first cutting the strips of steel the right length, then punching a hole in each end, of the size of the longitudinal rod. (See Fig. 11.) The rods are then inserted in these holes. The width of these compartments is determined by collars or sleeves made of refractory elastic material—such as refractory rubber—and slipped onto the rods between each strip of ribbon-steel. In Figs. 5 and 6 are shown a detail of these spaces, and in Fig. 3 they are shown in position, in which F F are the collars and G G are the ribbons of steel. These steel ribbons are elastic and will yield to pressure. These steel ribbons are covered with a refractory elastic material. (See Figs. 11 and 12, Fig. 12 being a cross-section of Fig. 11.) The center part shows the steel ribbon and the elastic covering on the outside thereof.

Each basket is provided with a cover. It is shown in Fig. 4, and consists of two end pieces H H, joined together by the longitudinal bars I I in a manner similar to the basket-heads. These rods are covered with the same refractory elastic material as other parts of the basket. One end of each end piece I' I' is hinged to one of the topmost rods of the other part of basket, and each of the other ends is provided with the recess J J, and when closed in position the two end pieces H H just come within the head-pieces A B of the basket, and the free ends J J of the end pieces close over the uppermost rod on the opposite side of the basket. (See Fig. 2.) The ends of the longitudinal rods where the recessed ends of the cover strike are covered with a metallic ring to aid in lessening the force of the blow on the rod. (See Fig. 6.) On the inside of each end piece of the cover is a strip of the ribbon-steel, covered with the refractory elastic material, to serve as a cushion to soften the contact of the dish with the end piece. (See J, Fig. 2.) This cover is not divided into compartments. On each end piece near the free end is a projection K' K', which comes up flush with the shoulder of the basket at this point. This enables the same means that holds the basket in position to be used to hold the cover snugly down in position.

In Fig. 2 is shown the basket in oval form. In Fig. 7 it is shown in nearer a square form and the compartments differently formed. The compartments are made in tray form and are removable, and the compartments are flat or horizontal. The longitudinal rods E E are more numerous in the base of this form of basket than in the other. (See Fig. 7.) The tray-formed partitions are made with two end pieces L and joined together by means of the intermediate rods E′ E′ in a manner similar to the cover, and on the same side of each end are recesses L′ L′, which fit over longitudinal rods in the basket-frame. (See Fig. 7.) The compartments formed by these tray-formed partitions can vary in width and can be made to do so by the longitudinal rod E being located at varying distances apart, or they may be uniform by placing the rods of uniform distance apart. The end pieces of the upper tray-formed partitions are provided with a central elevation M, against which one of the longitudinal rods L of the cover rests. All the longitudinal rods E′ E′ of the tray-formed partitions are covered with the same refractory elastic material as before mentioned, and the interior of each end piece is provided with the previously-described covered steel ribbon. (See N, Fig. 10.) The longitudinal rods used in the tray-formed partitions can be made elastic, if it is so desired. In use all the tray-formed partitions are removed. The bottom of the basket is covered with small dishes, as shown by the dotted lines N′, Fig. 7. A tray-formed partition is then placed in the basket over these dishes, when dishes are placed on this tray-formed partition, and so on until the last or uppermost tray-formed partition is placed in position, when the cover of the basket is closed down and placed in position for washing the dishes, when all the tray-formed partitions will be held snugly in place.

In using this basket in washing dishes they are placed in a revolving rack provided with longitudinal rods, and the rods which hold the baskets in position and hold the covers in position on the baskets are indicated by the circular dotted lines O O, and the bifurcated ends rest on corresponding longitudinal rods O′ O′, Fig. 7. Other parts of the revolving rack are not shown in the drawings.

In Fig. 8 is shown a detail of the compartments formed by the elastic steel ribbons, with an individual dish in each compartment. As the baskets holding dishes in the act of being washed are subjected to a vibratory or a revolving motion, the dishes must be held in position snugly. This is done by the elastic nature of the partitions. The compartment is slightly narrower than the dish is deep, which causes the dish to be snugly held in position. The same result is accomplished in the other form of partition by binding them together from the cover. The form of partition shown in Fig. 2 can be used in the form of basket shown in Fig. 7, if desired, and vice versa.

I claim—

1. A dish-washing basket consisting of heads, rods connecting said heads, and a cover composed of ends connected by rods and attached to the basket to close between the heads thereof, in combination with horizontal trays formed of ends connected by rods.

2. A dish-washing basket provided with a series of horizontal trays, the upper tray having a vertical projection which engages with the cover of the basket.

3. A dish-washing basket consisting of heads, rods connecting said heads, and a cover composed of ends connected by rods and attached to close between the heads, in combination with a series of trays formed of end pieces and rods connecting the same and resting upon rods in the body of the basket.

CHARLES A. HASKINS.

Witnesses:
JAS. A. COWLES,
M. COWLES.